Patented June 19, 1934

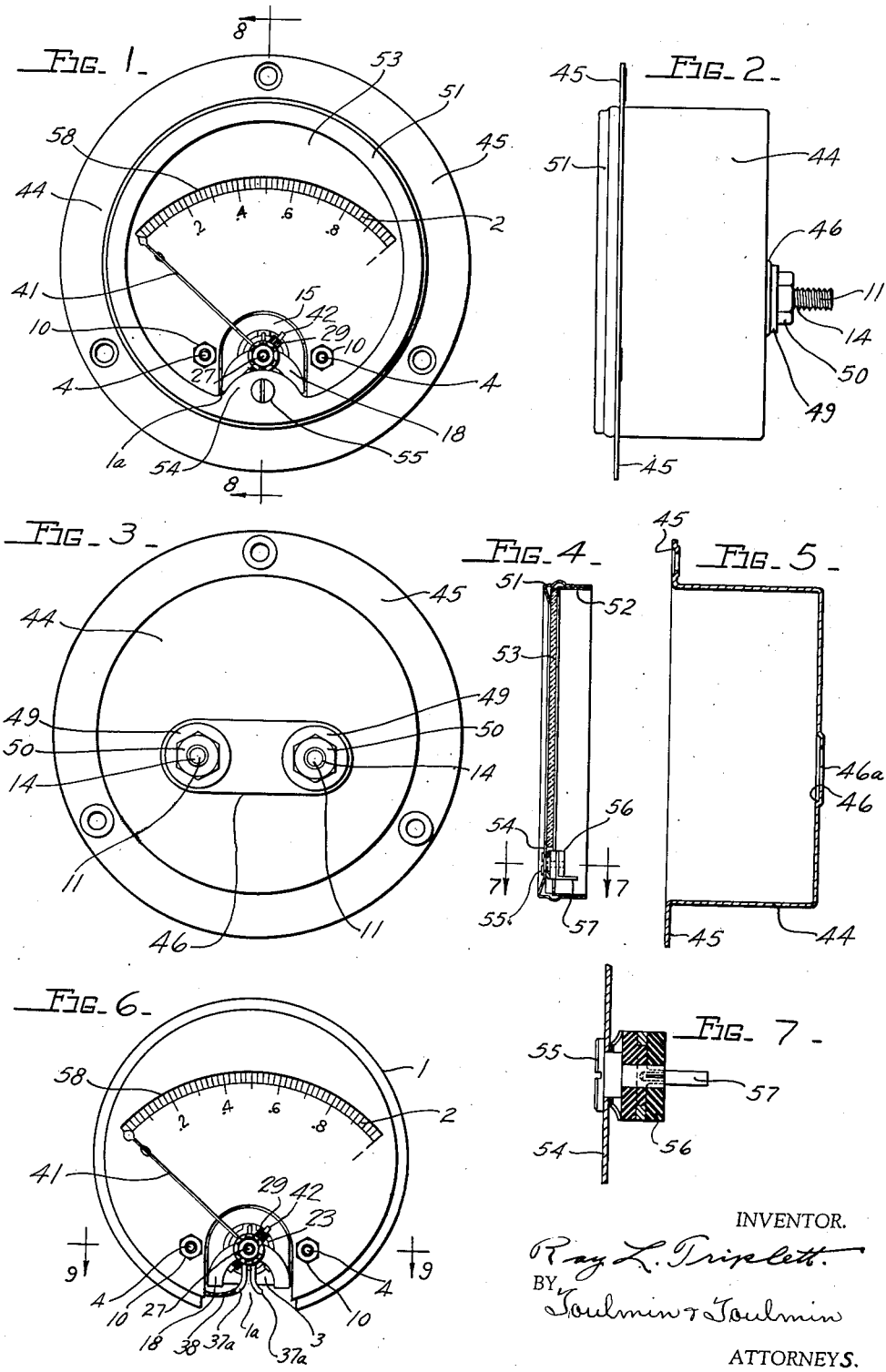

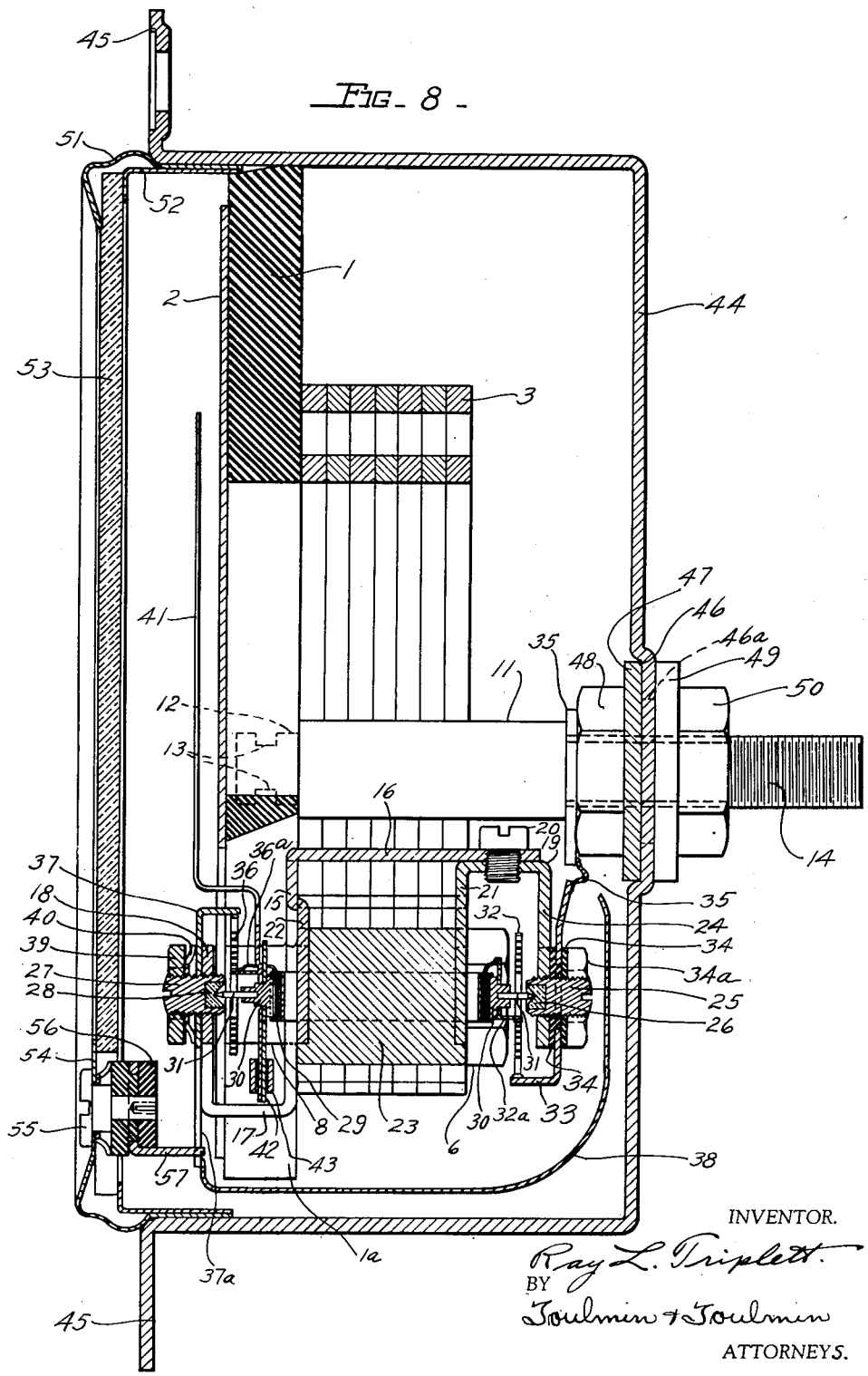

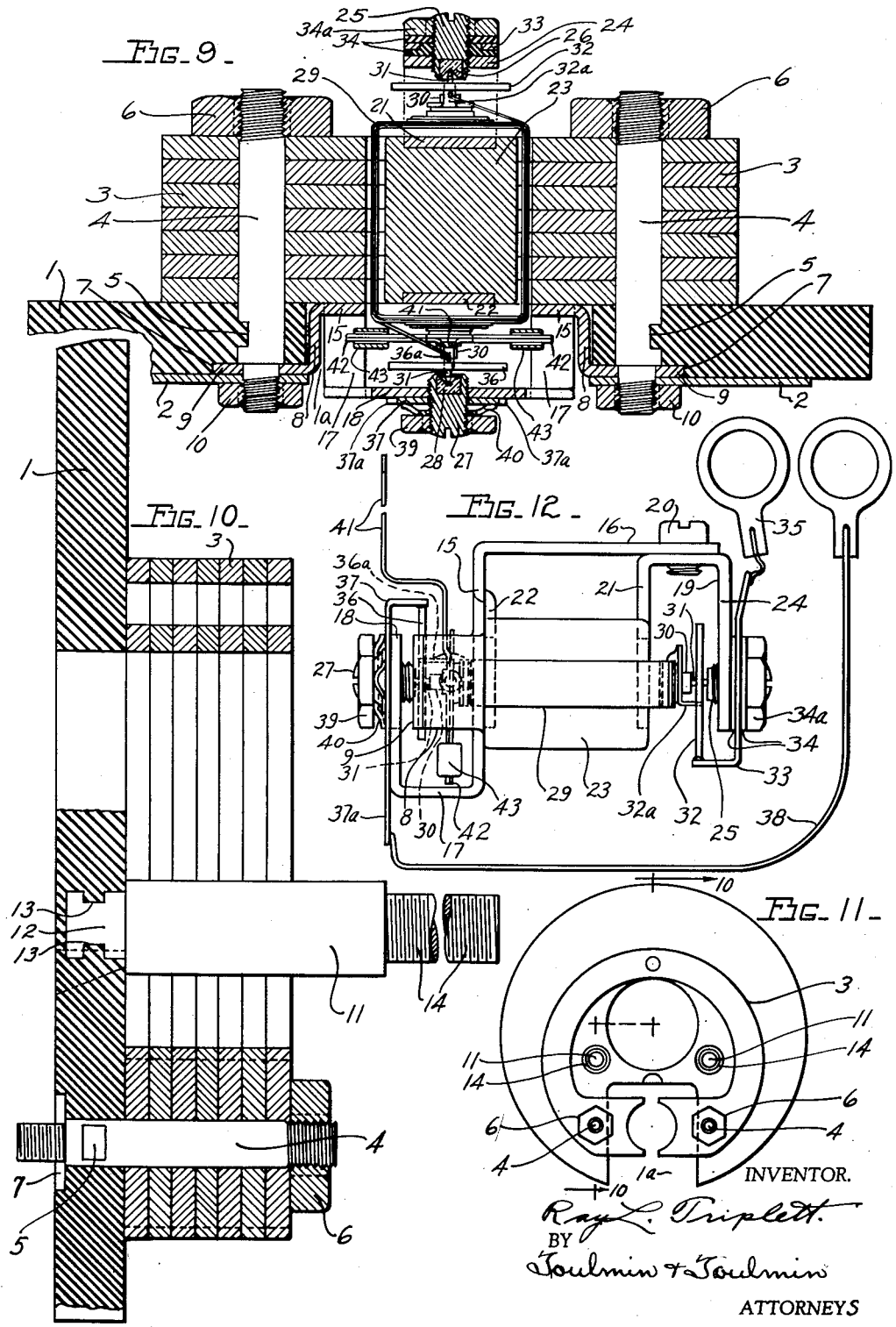

1,963,283

UNITED STATES PATENT OFFICE 1,963,283

MOVING COIL ELECTRICAL MEASURING INSTRUMENT

Ray L. Triplett, Bluffton, Ohio

Application February 24, 1933, Serial No. 658,379

11 Claims. (Cl. 171—95)

This invention relates to improvements in electrical measuring instruments, and has for its object to provide a mounting on which a permanent magnet may be supported, and on which other parts of the measuring instrument may be supported and may be separated from the magnet without being disturbed by the magnet and without disturbing the magnet.

It is also an object of this invention to provide a support for a permanent magnet and the moving parts of an electrical measuring instrument, consisting of a plate composed of a synthetic resinous material having studs embedded therein which project on opposite sides of the plate.

It is also an object of this invention to provide, in connection with an insulated plate, means on one side of the plate for supporting a permanent magnet, a framework for supporting the moving parts of an electrical measuring instrument, and means on the other side of the plate to support the framework.

It is also an object of this invention to provide means for supporting the moving parts of an electrical measuring instrument so that these parts may be inserted as a complete unit within a gap formed in a permanent magnet.

It is a further object of this invention to provide in an electrical measuring instrument, a magnet and steel core supported between the poles of the magnet, and armature coils supported to rotate about the core and between the core and the poles of the magnet.

An additional object is to provide a separate mounting of the magnet from the other parts of the movement so that the magnetism of the permanent magnet is not disturbed by the removal of the operating parts; and so that the magnet laminations will be drawn into accurate alignment with each other despite their warping during hardening. Thus the operating parts can be removed or inserted as a complete unit, separate from the magnet assembly, and when inserted there will be an accurate air gap between the poles of the magnet and the steel core, with the armature free to move in the air gap.

These and other objects and advantages will appear from the following description taken in connection with the drawings.

Referring to the drawings:

Figure 1 is a front elevation of the assembled measuring instrument.

Figure 2 is a side elevation.

Figure 3 is a back elevation.

Figure 4 is a section through the bezel for supporting a glass.

Figure 5 is a vertical section through the case.

Figure 6 is a front elevation of the supporting disc with the dial and moving parts thereon removed from the case.

Figure 7 is a section on the line 7—7 of Figure 4.

Figure 8 is a section on the line 8—8 of Figure 1.

Figure 9 is a section on the line 9—9 of Figure 6.

Figure 10 is a section on the line 10—10 of Figure 11.

Figure 11 is a rear view of the supporting plate with the permanent magnet thereon and the binding posts.

Figure 12 is a view showing the moving parts removed from the supporting plate.

The main supporting element for the measuring instrument consists of a circular plate 1 composed of a synthetic resin, such as a formaldehyde phenol condensation product. Any other suitable material that is insulating in its nature might be used. This plate has a notch 1a in one edge thereof, in which parts of the moving members are supported.

On the front face of the plate is a dial plate 2, of the same general shape but slightly smaller in diameter. This plate is located on one side of the supporting plate, while on the other side is a permanent magnet 3 composed of a plurality of laminæ properly assembled and formed into a horse-shoe magnet, with the ends arcuate and slightly spaced to provide an accommodation for parts of the moving elements. These laminæ that form the permanent magnet are held together and to the supporting plate by means of bolts or studs 4. There are two of these studs shown.

Adjacent one end of each stud is a notch 5 which receives a part of the material of the plate so that these bolts or studs are permanently secured within the plate. In fact, the plate is formed around these bolts or studs so that the notches are within the body of the plate. The greater length of each stud projects through the laminæ of the permanent magnet and has on its end a nut 6, used for clamping the laminæ forming the magnet together.

By means of these studs rigidly mounted in the supporting plate the magnetic laminations are forced to assume a flat position so that any deformations that may be in the laminations are removed and the laminations form a magnet in which the pole pieces will be maintained in alignment and in proper spaced relationship.

Around the end of each bolt or stud on the side of the plate opposite the magnet, the plate is provided with a seat 7, in which is located one end 9 of a yoke 8. These ends are held in the seats and on the ends of the studs opposite the magnet by means of nuts 10. The part of the yoke intermediate the ends extends into the notch 13 therein embedded in the material of the plate. The other end of each terminal post is reduced and threaded at 14 to support electrical wires and for supporting the plate and parts supported by the plate within a case. The central part of the yoke 8 is U-shaped, as indicated by the numeral 15, and has its closed end extending upwardly.

From this closed end there is a rearwardly extending arm 16, which has attached thereto a downwardly extending U-shaped bracket 19 attached to the arm 16 by means of a screw 20. One arm 21 of the U-shaped bracket 19 and an arm 22 extending from the part 15 of the yoke 8 form supports for a steel core 23. This steel core is mounted between these two arms and is rigidly held by the arms. This steel core is round, and when in operating position is located between the ends of the permanent magnet.

The other arm 24 of the bracket 19 has therein a screw threaded plug 25, which has in its inner end, in a socket provided therein, a jewel 26. A plug 27 in alignment with the plug 25 is supported in an arch 18, on arms 17, and has in the end thereof a jewel 28. These jewels serve as bearing supports for the armature coil 29, which surrounds the steel core and is adapted to move between the steel core and the ends of the permanent magnet adjacent the core.

This coil is rectangular in shape and has at each end a hub 30, from which extends a spindle or shaft 31 engaging in one of the jewels so that the armature may be supported for free rotation about the steel core, and between the steel core and the ends of the permanent magnet. To one end of the armature coil adjacent one of the hubs 30 is attached one end of a spring 32 by means of a connecting bracket 32a. This bracket is supported by the hub and is connected at one end to the coil, while its other end serves as a support to which one end of the spring is attached. The other end of the spring is attached to a supporting arm 33, which has a suitable hole therein for receiving the plug 25.

On each side of the arm 33 and around the plug 25 is an insulating washer 34. The washers and the arm 33 are held upon the plug 25 by means of a nut 34a. The arm 33 has attached thereto an electrical conductor 35, adapted to be connected to one of the terminal posts. To the other end of the armature coil, adjacent the other hub, is attached one end of a coil spring 36 by means of a connecting bracket 36a, which is supported by the hub. The other end of this spring is attached to one end of an arm 37, which is supported on the plug 27 by means of a nut 39, which has between it and the arm a spring washer 40.

The end of the arm 37 remote from the spring is formed into two prongs 37a, to one of which prongs is attached one end of an electrical conductor 38, which has its other end, by some suitable means, attached to the other binding post. The plugs 25 and 27 serve as bearings for the armature winding and may be adjusted to take up any wear that occurs in the spindles which support the armature winding.

On the hub and between the armature winding and the spring 36 is a pointer 41, which has extending therefrom about the hub, arms 42, each of which has a weight 43 thereon. The weights, together with the springs, tend to hold the pointer in a zero position, as shown in Figure 1.

When it is desired to remove the moving parts from the supporting plate the nuts 10 may be removed so that the yoke 8 may be withdrawn from the ends of the studs 4. During this withdrawal the core and the coil and the parts supporting them may be withdrawn from between the ends of the magnet, and be entirely removed without disturbing the magnet, or without any other operation than the removal of the nuts 10 and the dial supported by the studs 4. The magnet may be removed without disturbing any other part of the instrument.

The supporting plate with the various parts thereon is supported within a suitable case, such as that shown in Figures 1, 2, 3 and 5. This case 44 is cup-shaped and has around its open end a flange 45, by which it may be suitably supported on some panel or other structure. In the bottom of the case is an elongated depression 46, which has therein holes 46a to receive the terminal posts for holding the plate within the case. In the depression is an elongated washer 47, which has a hole therein for each hole 46a.

The screw threaded ends of the terminal posts extend through the holes 46a and through the holes in the washer 47. Between the washer 47 and the electrical conductors are nuts 48. These nuts serve to hold the conductors in position on the terminal posts, and also serve, in cooperation with the washers 49 and nuts 50, to clamp the bottom of the case so that the plate and the parts located thereon are securely held within the case.

The open end of the case is closed and for that purpose there is provided, around the periphery of the case, a bezel composed of an outer part 51, an inner part 52 and a glass 53, located between the two parts 51 and 52. On the outer part of the bezel is an inwardly extending projection 54, which has therein a screw or similar member 55. On this screw is a washer composed of insulated material 56, which carries a prong or projection 57 that extends between the prongs of the arm 37 when the parts are located and in operative position. A suitable scale is provided on the dial plate 2 and is indicated by the numeral 58.

The moving or armature coil has its pivots at its ends and rotates around the fixed core, and is centrally aligned by means of the jewel bearings, which are held in suitable arms formed on the supporting yoke. The spiral springs attached to the moving coil serve to convey electric current to the coil and also to control the movement of the coil.

When the assembled armature moving coil is placed in position between the poles of the permanent magnet the armature will be free to move in the air gap between the poles of the magnet and the steel core cutting the magnetic lines of force which are set up in this gap. The indicating needle or pointer attached to the coil will thus indicate on the scale at any definite position the amount of current which is passing through the coil.

It will thus be seen that some of the important features of the invention are:

The mounting of the magnet laminations which are warped during hardening process so that they are drawn back in accurate alignment with each other by being mounted on an insulation base, to which are molded or fastened the supporting bolts for the magnet laminations.

This insures that the pole spaces will be uniformly maintained in their axial alignment.

The two brass plates are accurately formed for mounting and holding in predetermined fixed position the steel core and the two bearing arms.

The assembled armature moving coil is placed in position within the poles of the permanent magnet so that the armature is free to move in the air gap between the poles of the magnet and the steel core, cutting the lines of force which are set up in this gap, so that the indicating needle which is attached to the coil will indicate on the scale any definite position according to the amount of current which is passing through the coil.

The moving coil has pivots mounted at each end rotating around the fixed steel core and centrally aligned in the two jewel bearings which are held in the two arms of the plate.

The use of the bakelite plate affords a uniform insulation between the assembled parts and the metal housing to protect them from any possible external circuit.

It will be understood that I desire to comprehend within my invention such modifications as come within the scope of my claims and my invention.

Having thus fully described my invention, what I claim as new and desire to secure by Letters Patent, is:

1. In an electrical instrument, a support consisting of supporting studs, and a plate of insulating material formed around the studs intermediate their ends.

2. In an electrical instrument, a support consisting of supporting studs, each having a notch therein intermediate its ends, and a plate of insulating material surrounding the studs at the notches and having some of the material of the plate projecting into the notches.

3. In an electrical instrument, a supporting plate, studs embedded in the plate, each stud extending on opposite sides of the plate, and a magnet on the studs on one side of the plate.

4. In an electrical instrument, a supporting plate, studs embedded in the plate, each stud extending on opposite sides of the plate, and a magnet on the studs on one side of the plate, said magnet consisting of laminations clamped together on the plate by the studs.

5. In an electrical instrument, a plate having therein studs, each stud projecting on each side of the plate, a magnet supported by the studs on one side of the plate, a yoke member supported by the studs on the other side of the plate, and a rotating member supported by the yoke between the ends of the magnet.

6. In an electrical measuring instrument, a plate having therein a notch, a stud in the plate on each side of the notch, a magnet on one side of the plate supported by the studs, a yoke on the other side of the plate supported by the studs, and a rotating member supported by the yoke between the ends of the magnet.

7. In an electrical measuring instrument, a plate having therein a notch, a stud in the plate on each side of the notch, a magnet supported on one side of the plate by the studs, a yoke supported by the studs on the other side of the plate, a steel core rigidly supported by the yoke between the ends of the magnet, and a coil supported by the yoke for rotation about the core and between the core and the ends of the magnet.

8. In an electrical measuring instrument, a plate having therein a notch and on each side of the notch a stud, a magnet supported by the studs on one side of the plate, a yoke supported by the studs on the other side of the plate, a pair of arms on the yoke, a core rigidly supported by the arms between the ends of the magnet, a coil adapted to rotate around the core and between the core and the ends of the magnet, and means adjustably supported by the yoke for rotatably supporting the coil.

9. In an electric measuring instrument, a fixed magnet having spaced ends, a fixed core supported in a fixed position between the ends of the magnet, and a coil supported for movement about the core and between the core and the ends of the magnet, said core and coil being supported as a unit independent of the magnet, whereby they may be moved from the magnet without disturbing it.

10. In an electric measuring instrument, a permanent magnet having spaced arcuate ends, a yoke, a core supported by the yoke between and equally spaced from the ends of the magnet, bearing arms on the yoke, an armature coil supported by the bearing arms for movement about the core and between the core and the ends of the magnet, and a common means for supporting the yoke and the magnet so that the yoke and the parts supported thereby may be moved from the magnet without disturbing the magnet.

11. In an electric measuring instrument, a magnet having spaced arcuate ends, a yoke, a core supported by the yoke between the ends of the magnet, bearing arms on the yoke, an armature coil supported by the arms for movement about the core and between the core and the ends of the magnet, a coil spring at each end of the coil, each coil spring having one end connected to the coil and the other end connected to one of the arms, and an electric circuit through the coil, said springs forming parts of the circuit.

RAY L. TRIPLETT.